(12) United States Patent
Tevosyan et al.

(10) Patent No.: US 7,702,917 B2
(45) Date of Patent: Apr. 20, 2010

(54) DATA TRANSFER USING HYPER-TEXT TRANSFER PROTOCOL (HTTP) QUERY STRINGS

(75) Inventors: Kahren Tevosyan, Kirkland, WA (US); Matthew Hur, Newcastle, WA (US); Ryan D Johnson, Bothell, WA (US); Donald E Schmidt, Redmond, WA (US); Jeffrey F Spelman, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1522 days.

(21) Appl. No.: 10/993,745

(22) Filed: Nov. 19, 2004

(65) Prior Publication Data

US 2006/0112422 A1 May 25, 2006

(51) Int. Cl.
*G06F 21/00* (2006.01)
(52) U.S. Cl. ..................................................... 713/185
(58) Field of Classification Search .................. 713/185
See application file for complete search history.

(56) References Cited

U.S. PATENT DOCUMENTS

| | | | |
|---|---|---|---|
| 5,684,950 A | 11/1997 | Dare et al. | |
| 5,768,503 A | 6/1998 | Olkin | |
| 5,815,665 A | 9/1998 | Teper et al. | |
| 5,991,802 A | 11/1999 | Allard et al. | |
| 6,067,623 A | 5/2000 | Blakley, III et al. | |
| 6,141,758 A | 10/2000 | Benantar et al. | |
| 6,178,511 B1 | 1/2001 | Cohen et al. | |
| 6,195,682 B1 | 2/2001 | Ho et al. | |
| 6,212,635 B1 * | 4/2001 | Reardon ...................... 713/165 |
| 6,219,651 B1 | 4/2001 | Bublitz et al. | |
| 6,240,512 B1 | 5/2001 | Fang et al. | |
| 6,243,816 B1 | 6/2001 | Fang et al. | |
| 6,275,944 B1 | 8/2001 | Kao et al. | |
| 6,339,827 B1 | 1/2002 | Stokes et al. | |
| 6,351,819 B1 | 2/2002 | Berglund et al. | |
| 6,370,561 B1 | 4/2002 | Allard et al. | |
| 6,374,283 B1 | 4/2002 | Chessell et al. | |
| 6,453,362 B1 | 9/2002 | Bittinger et al. | |
| 6,687,831 B1 | 2/2004 | Albaugh et al. | |
| 6,954,778 B2 | 10/2005 | Harjanto | |
| 2002/0144108 A1 | 10/2002 | Benantar | |
| 2002/0144119 A1 | 10/2002 | Benantar | |
| 2002/0184507 A1 | 12/2002 | Makower et al. | |

(Continued)

OTHER PUBLICATIONS

Darpa, RFC 791—Internet Protocol, Sep. 1981.*

(Continued)

*Primary Examiner*—Kimyen Vu
*Assistant Examiner*—Michael S McNally
(74) *Attorney, Agent, or Firm*—Merchant & Gould P.C.

(57) ABSTRACT

The described systems, methods, and data structures are directed at data transfer using Hyper-Text Transfer Protocol (HTTP) query strings. A block of data is partitioned into sections. Each section is encoded in a query string of a HTTP message. Each HTTP message is sent to a server by redirecting through a client. Multiple redirected messages are sent until the entire block of data is transferred to the server. The data block may be stored as a cookie on the client so that the data block does not have to persist on any server. Data transfer using HTTP query strings may be implemented to transfer a security token from a security token service (STS) server to an application server.

28 Claims, 6 Drawing Sheets

U.S. PATENT DOCUMENTS

| | | | |
|---|---|---|---|
| 2002/0194508 | A1 | 12/2002 | Sanchez et al. |
| 2003/0005118 | A1* | 1/2003 | Williams ..................... 709/225 |
| 2003/0041178 | A1* | 2/2003 | Brouk et al. ................ 709/313 |
| 2003/0105981 | A1* | 6/2003 | Miller et al. ................ 713/202 |
| 2003/0133436 | A1* | 7/2003 | Patel et al. .................. 370/352 |
| 2003/0177388 | A1 | 9/2003 | Botz et al. |
| 2003/0221126 | A1 | 11/2003 | Berman et al. |
| 2003/0233543 | A1 | 12/2003 | Nagaratnam et al. |
| 2003/0236975 | A1 | 12/2003 | Birk et al. |
| 2004/0002878 | A1 | 1/2004 | Hinton |
| 2004/0030764 | A1 | 2/2004 | Birk et al. |
| 2004/0078604 | A1* | 4/2004 | Rice et al. ................... 713/202 |
| 2004/0128541 | A1 | 7/2004 | Blakley et al. |
| 2004/0230831 | A1 | 11/2004 | Spelman et al. |
| 2005/0015593 | A1 | 1/2005 | Cheng et al. |
| 2005/0076051 | A1* | 4/2005 | Carobus et al. ............ 707/102 |
| 2005/0114701 | A1 | 5/2005 | Atkins et al. |
| 2005/0132222 | A1* | 6/2005 | Petrovic ..................... 713/201 |
| 2005/0223093 | A1* | 10/2005 | Hanson et al. ............. 709/224 |
| 2005/0223217 | A1 | 10/2005 | Howard et al. |
| 2005/0277420 | A1 | 12/2005 | Shin et al. |
| 2006/0021019 | A1 | 1/2006 | Hinton et al. |
| 2006/0080352 | A1 | 4/2006 | Boubez et al. |
| 2006/0080730 | A1 | 4/2006 | Cahill |
| 2006/0112422 | A1 | 5/2006 | Tevosyan et al. |
| 2006/0123234 | A1 | 6/2006 | Schmidt et al. |

OTHER PUBLICATIONS

Groβ, Thomas. "Security Analysis of the SAML Single Sign-on Browser/Artifact Profile," Computer Security Applications Conference, 2003; Dec. 8-12, 2003; pp. 298-307.
De Clercq, Jan; Single Sign-On Architectures; www.csat.kuleuyen.ac.be/cosic/seminars/slides/sso.pdf; 2000; 30 pages.
[CatalystFedInterop] Gebel, G., "Multiprotocol Federation Interoperability Demonstration MBP", 2005, http://campaign.burtongroup.com/CT000479010TI4.html. (Dispite best efforts, a copy of the above cited reference could not be located).
Liberty Alliance Project, "Liberty ID-FF Protocols and Schema Specification, Version: 1.2-errata-v.3.0," 2004, http://www.projectliberty.org/specs/draft-liberty-idff-protocols-schema-1.2-errata-v3.0.pdf.
Microsoft Corporation, "Domain Controllers," http://www.microsoft.com/windows2000/en/advanced/help/sag_ADintro_26.htm?id=289.
IBM, Microsoft Corporation, "Passive Requestor Federation Interop Scenario Version 0.4," Feb. 2004, ftp://www6.software.ibm.com/software/developer/library/ws-fpscenario2.doc.
Dierks, T.; Allen, C. "The TLS Protocol Version 1.0," RFC 2246, Jan. 1999, http://www.ietf.org/rfc/rfc2246.txt.
Kristol, D.; Montulli, L. "HTTP State Management Mechanism," RFC 2965, Oct. 2000, http://www.ietf.org/rfc/rfc2965.txt.
Jonsson, J; Kaliski, B. "Public-Key Cryptography Standards (PKCS) #1: RSA Cryptography Specifications Version 2.1," RFC 3447, Feb. 2003, http://www.ietf.org/rfc/rfc3447.txt.
Blake-Wilson, S.; Nystrom, M.; Hopwood, D.; Mikkelsen, J.; Wright, T. "Transport Layer Security (TLS) Extensions," Jun. 2003, http://www.ietf.org/rfc/rfc3546.txt.
Neuman, C.; Yu, T., Hartman, S., and K. Raeburn, "The Kerberos Network Authentication Service (V5)", Jul. 2005, http://www.ietf.org/rfc/rfc4120.txt.
Hughes, J., Cantor, S., Hodges, J., et al., "Profiles for the Oasis Security Assertion Markup Language (SAML) V2.0", Mar. 2005, http://docs.oasis-open.org/security/saml/v2.0/saml-profiles-2.0-os.pdf.
National Institute of Standards and Technology, "Secure Hash Standard," FIPS 180-1, May 1994, http://www.itl.nist.gov/fipspubs/fip180-1.htm.
Freier, A.; Karlton, P.; Kocher, P. "The SSL 3.0 Protocol," Netscape Communications Corp., Nov. 1996.
"Oasis Security Services (SAML) TC," www.oasis-open.org/committees/tc_home.php?wg_abbrev=security; May 7, 2003; 4 pages.
Tivoli Secure Way Global Sign-On; Information Systems Management Canada Corporation, IBM Global Services; 30 pages; Canada.
eTrust Single Sign-On, Managing User Access in an eBusiness Environment; Computer Associates; 2000; 11 pages; Islandia, NY (Dispite best efforts, a copy of the above cited reference could not be located).
Using Tivoli Secure Way to Manage e-Business Security; www.cio.com/sponsors/060100_tivoli.html; May 6, 2003; 9 pages.
Bajaj et al., *WS-Federation: Passive Requestor Profile* [online], Version 1.0, Jul. 8, 2003, [Retrieved Mar. 4, 2007], Retrieved from: http://msdn2.microsoft.com/en-us/library/ms951223(d=printer).aspx. [34 pages].
Berners-Lee, T., Fielding, R., Masinter, L., *Uniform Resource Identifiers (URI): Generic Syntax*, RFC 2396, Aug. 1998. [40 pages].
Berners-Lee, T., Fielding, R., Masinter, L., *Uniform Resource Identifier (URI): Generic Syntax*, RFC 3986, Jan. 2005. [55 pages].
Gaedke, M., Meinecke, J., Nussbaumer, M., *A Modeling Approach to Federated Identity and Access Management*, ACM 1-59593-051-5/05/0005, May 10-14, 2005. [2 pages].
Gomi, H., Hatakeyama, M., Hosono, S., Fujita, S., *A Delegation Framework for Federated Identity Management*, ACM 1-59593-232-1/05/0011, Nov. 11, 2005. [10 pages].
Del Vecchio, D., Basney, J., Nagaratnam, N., *CredEx: User-Centric Credential Management for Grid and Web Services*, 2005 IEEE International Conference on Web Services (ICWS 2005), Jul. 12-15, 2005. [8 pages].
Della et al., *Web Services Trust Language (WS-Trust)*, Version 1.0, Dec. 18, 2002. [30 pages].
Fielding et al., *Hypertext Transfer Protocol—HTTP/1.1*, RFC 2068, Jan. 1997. [162 pages].
Fielding et al., *Hypertext Transfer Protocol—HTTP/1.1*, RFC 2616, Jun. 1999. [114 pages].
IBM, *Web Services Trust Language* [online], [Retrieved Jan. 31, 2008], Retrieved from: http://www.ibm.com/developerworks/library/specification/ws-trust/. [2 pages].
Kohl, J., Neuman, C., *The Kerberos Network Authentication Service (V5)*, RFC 1510, Sep. 1993. [52 pages].
Lampson et al., *Authentication in Distributed Systems: Theory and Practice*, Digital Equipment Corporation, ACM Trans. Computer Systems 10, 4, pp. 265-310, Nov. 1992. [47 pages].
Lampson, B., Rivest, R., *SDSI—A Simple Distributed Security Infrastructure*, Sep. 15, 1996. [47 pages].
Leach et al., *A Conceptual Authorization Model for Web Services*, Computer Systems: Theory, Technology, and Applications, pp. 137-146, Feb. 2003. [8 pages].
NetBSD Programmer's Manual, *Name-Service Switch* [online], [Retrieved Apr. 11, 2007], Retrieved from: http://netbsd.gw.com/cgi-bin?nsswitch.conf++NetBSD-1.4.3. [3 pages].
Oasis Security Services (*SAML*) *TC* [online], [Retrieved Jan. 31, 2008], Retrieved from: http://www.oasis-open.org/committees/tc_home.php?wg_abbrev=security. [8 pages].
Paschoud, J., McLeish S., *Managing Access to Decomate Resources*, Decomate2 Conference, Jun. 2000. [9 pages].
Secure Computing, *SafeWord PremierAccess* [online], [Retrieved Oct. 19, 2007], Retrieved from: http://www.ibm.com/developerworks/library/specification/ws-trust/. [16 pages].
Sun Microsystems, *Name-Service Switch* [online], [Retrieved Jan. 31, 2008], Retrieved from: http://compute.cnr.berkeley.edu/cgi-bin/man-cgi?nsswitch.conf. [9 pages].
Security Assertion Markup Language (SAML) (No Document).

* cited by examiner

DATA TRANSFER USING HYPER-TEXT TRANSFER PROTOCOL (HTTP) QUERY STRINGS

BACKGROUND

Web Single Sign-On (WebSSO) is a technology that allows a client to access multiple protected Web resources once a user is signed on at a trusted Security Token Service (STS) server. After a successful sign-on at the STS server, a security token containing the user's security properties is issued by the STS server. The STS server would then have to deliver the issued security token to the protected Web resource through the client.

One method for delivering the token to the Web resource is by downloading a script onto the client where the script would use a HTTP Post message to transfer the security token to the Web resource. However, this method may not work for clients that restrict the downloading or execution of scripts. The method also does not work for clients that cannot handle HTTP Post requests.

An effective technique for transferring security tokens in a HTTP communication environment without using Post messages continues to elude those skilled in the art.

DESCRIPTION OF THE DRAWINGS

These and other features and advantages of the present invention will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples of the invention and is not intended to represent the only forms in which the present invention may be constructed or utilized. The description sets forth the functions of the invention and the sequence of steps for constructing and operating the invention in connection with the examples illustrated. However, the same or equivalent functions and sequences may be accomplished by different examples of the invention.

Although the present examples are described and illustrated herein as being implemented in a security token transfer system, the system described is provided as an example and not a limitation. As those skilled in the art will appreciate, the present examples are suitable for application in a variety of different types of data block transfer systems.

Figure 1:
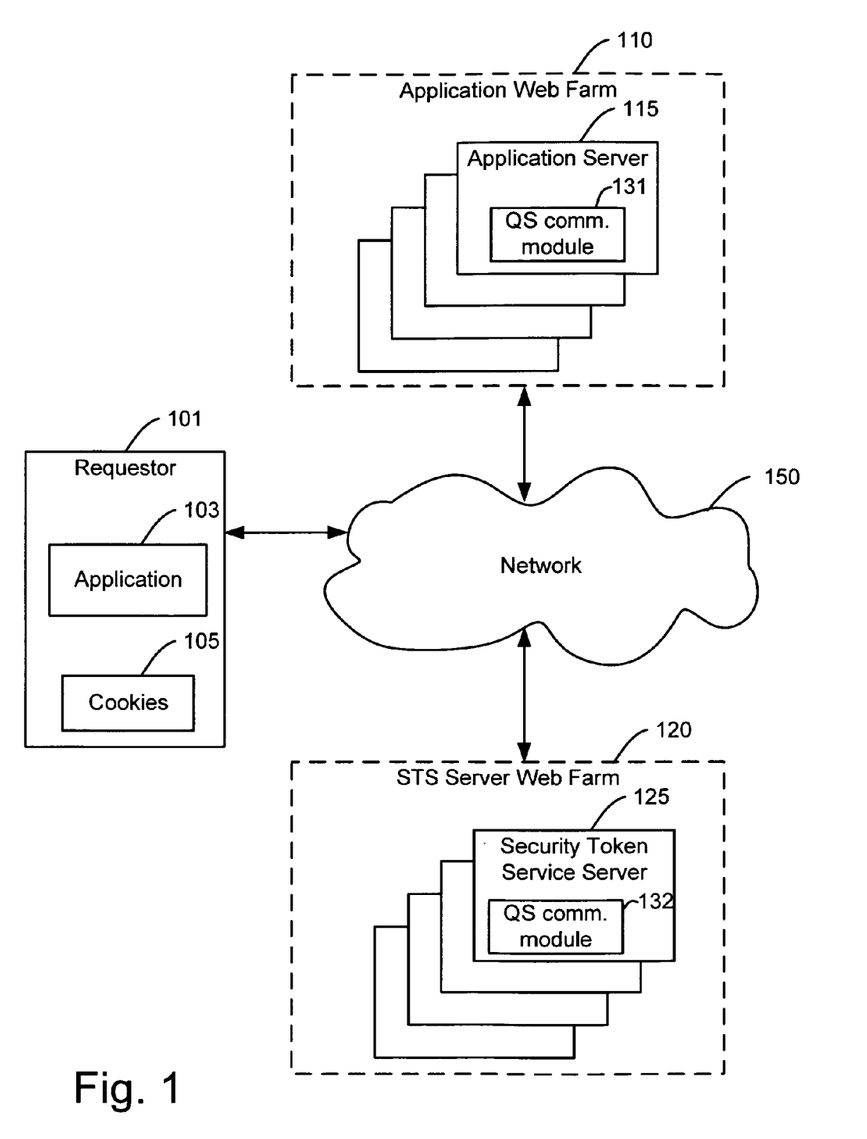
FIG. 1 illustrates an example query string data transfer system.

FIG. 1 illustrates an example query string data transfer system. In the most basic form, the example system includes query string communication modules 131-132. Query string communication modules 131-132 are logical components that are configured to transfer blocks of data to each other in a Hyper-Text Transfer Protocol (HTTP) communication environment. Query string communication modules 131-132 may be incorporated in any software or hardware components. Components with a query string communication module may transfer data blocks to each other using query strings in HTTP requests. Typically, a data block may be transferred between an originating component to a destination component by redirecting a HTTP message through an intermediary component. The data block may be transferred through a query string in the redirected HTTP message. For a data block of a size that is larger than the maximum allowable size of a HTTP query string, the data block may be partitioned and transferred using multiple redirected HTTP messages.

In the example illustrated in FIG. 1, query string communication modules 131-132 are implemented in application server 115 and security token service (STS) server 125, respectively. The application server 115 and STS server 125 may use query string communication modules 131-132 to transfer data blocks to each other through network 150 and requestor 101. It is to be appreciated that the example in FIG. 1 is just one implementation included for illustrative purposes. Query string communication modules 131-132 may be implemented in other components and may offer similar data block transfer functionalities to those other components.

Requestor 101 is a computing device configured to communicate with other computing devices. Particularly, requester 101 may include applications that are configured to interact with other devices using HTTP. In the example illustrated in FIG. 1, requester 101 includes application 103 that is configured to interact with application server 115 and STS server 125 using HTTP based communication. Application 103 may be configured to process any type of HTTP communication, such as requests, redirects, cookies information or the like. Requestor 101 may also store cookies 105, which are packages of information provided to requestor 101 by application server 115 and STS server 125. When requestor 101 sends a request to a particular server, requester 101 may be configured to send the cookie corresponding to the server along with the request.

Application server 115 is configured to respond to requests issued by requestor 101. Application server 15 may be associated with a location identifier, such as a Universal Request Locator (URL) or an Internet Protocol (IP) address. The requests typically identify application server 115 by the associated location identifier. To enhance security, application server 115 may require a security token before providing data in response to a request by requestor 101. A security token is a data element that includes security related information associated with a user. The security token may include any type of data, such as authentication data, properties, user name, group affiliation, or the like. If requestor 101 is unable to provide such a security token, application server 115 may redirect requestor 101 to STS server 125 to obtain the security token.

Query string communication module 131 may interact with query communication module 132 to transfer the security token from STS server 125 to application server 115 in a query string of a redirected HTTP request. A security token often contains a significant amount of data and may be of a size that is larger than the maximum allowable size of a query string. In this situation, query string communication module 131 may be configured to receive the security token through multiple redirected HTTP messages where each message may include a query string that contains a section of the security token.

To efficiently handle volumes of requests, application web farm 110 may be implemented. Application Web farm 110 may include multiple servers that perform functionalities similar to those of application server 115. Application Web farm 110 may be configured to process requests identifying a particular location identifier. Thus, a request with the particular address may be processed by any of the servers in application Web farm 10. As discussed above, a security token may be transferred in the query strings of multiple redirected HTTP messages, where each message includes a section of the security token. However, these redirected messages may be handled by different servers in application Web farm 110. To enable a particular server to be aware of a section of the security token received from a previous message that is handled by another server in application Web farm 110, the section may be included in a cookie saved on requester 101. The cookie may be sent to the server in application Web farm 110 along with each redirected HTTP request.

STS server 125 is configured to provide security tokens to application servers, such as application server 115. STS server 125 may be a part of a Web Single Sign-on (Web SSO) system that enables users to access resources from multiple application servers by performing one sign-on procedure. After a successful sign-on by a user, STS server 125 is configured to provide a security token to each participating application server from which the user requests resources. For example, application server 115 may require requester 101 to provide a security token before responding to a request sent by requester 101. STS server 125 is configured to provide the security token to application server 131.

As shown in FIG. 1, STS server 125 may include query string communication module 132, which may interact with query string communication module 131 to transfer the security token from STS server 125 to application server 115. The security token is typically transferred by redirecting a HTTP message to application server 115 through requester 101. In particular, the redirected HTTP message may include a query string that contains the security token. In some situation, the size of the security token may exceed the maximum allowable size of a HTTP query string. Query string communication module 132 in STS server 125 is configured to partition the security token into multiple sections and to transfer the sections to application server 115 in the query strings of multiple redirected HTTP requests.

To provide scalable performance, STS server Web farm 120 may be implemented. STS server Web farm 120 typically includes multiple servers that are configured to provide security tokens. For the situation where a security token is partitioned into multiple sections and the sections are transferred in query strings of multiple redirected HTTP requests, the entire security token may be stored as a cookie on requester 101 so that any server in STS server Web farm 120 may handle a request to transfer any section of the security token.

In operation, requester 101 sends a request to application server 115 (or application Web farm 110). Before responding to the request, application server 115 may obtain information about requester 101 in the form of a security token issued by STS server 125. Specifically, application server 115 determines that the configuration of requester 101 requires the security token to be transferred using HTTP query strings. Application server 115 sends a HTTP message to requester 101 for redirecting to STS server 125. The message includes a request for special security token transfer using HTTP query strings.

In response to the redirected message from application server 115, STS server 125 identifies a security token based on a current or previous user sign-on. STS server 125 partitions the security token into sections appropriate for transferring using query strings. STS server 125 then sends the sections of the security token to application server 115 in query strings of multiple HTTP messages redirected to application server 115 through requester 101. The security token is typically represented in binary bits. Thus, the security token is base 64 encoded for inclusion in the query string. To reduce the number of redirect messages, the security token may be compressed prior to the base 64 encoding to reduce the amount of data to be transferred.

The security token may be saved in a cookie so that any server in STS server Web farm 120 may transfer the remaining sections of the cookie through subsequent HTTP messages. Similarly, a cookie may be saved for received sections on the security token so that any server in application Web farm 115 may process successive transfer of the security token. Any type of cookies may be used. However, session cookies may be used to enhance security for the tokens.

Figure 2:
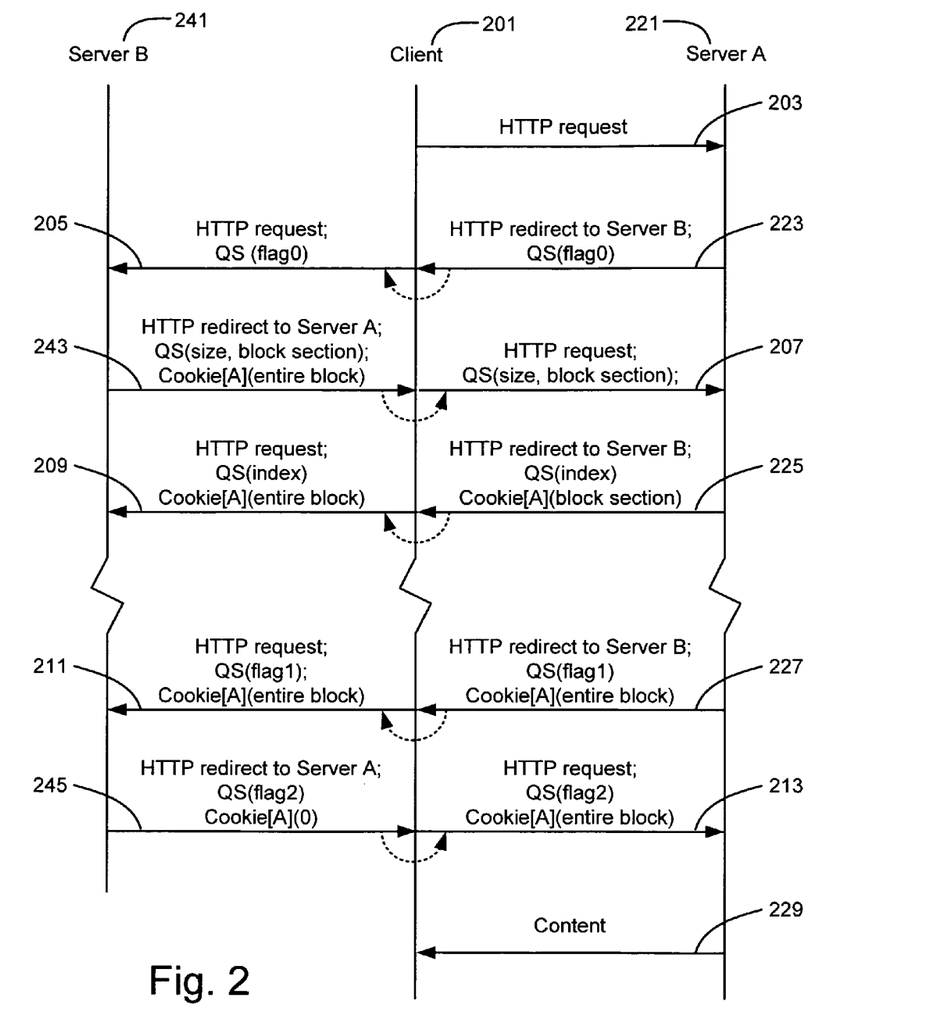
FIG. 2 shows example communication messages and communication method that may be used to transfer a data block between two servers.

FIG. 2 shows example communication messages and communication method that may be used to transfer a data block between two servers. Server B 241 is configured to provide the data block. For the purpose of discussion, the data block is too large to be included in the query string of a single HTTP message. Thus, the data block is transferred to server A 221 in the query strings of multiple HTTP messages redirected through client 201. Also, the example communication messages in FIG. 2 are shown as communication between two servers for illustrative purpose. It is to be appreciated that any of the example messages may be communicated between servers on two Web farms.

The example communications begin when client 201 sends a message 203 with a request to server A. In response to message 203, server A sends a message 223 with a request to client 201. This request contains instructions for client 201 to redirect the request to server B. Message 223 also contains a query string with a flag for indicating to server B to transfer a data block to server A in query strings of HTTP messages. The flag can be any type of indicator, such as a parameter assigned to a certain value. Client 201 receives message 223 and redirects as message 205 to server B.

In response to message 205, server B determines a data block identified in message 205 and creates a cookie that includes the data block. If the data block is not in a format transmittable by HTTP messages, the data block may be base 64 encoded. To reduce the amount of data for transmission, the data block may also be compressed prior to base 64 encoding. Server B partitions the data block into multiple sections. Then, server B sends a message 243 with a request to client 201. The request contains a query string with the size of the entire data block, the first partitioned section of the data block, and instructions for client 201 to redirect the request to server A. Message 243 also may contain the cookie with the entire data block. Client 201 receives message 243 and redirects the request to server A as message 207. Client 201 also stores the cookie associated with server B provided by message 243. Any type of cookies may be used. In this example, a session cookie is used.

In response to message 207, server A identifies the length of the entire data block and the first partitioned section of the data block. Server A creates a cookie that includes the section of the data block and an index that represents a point in the data block, such as an end point of the current section or a start point of the next section of the data block. Server A then sends a message with a request and the cookie with the section of the data block to client 201. The request contains a query strings with the index. Client 201 receives message 225 and redirects the request to server B as message 209. Client 201 also sends the cookie associated with server B with message 209. Client 201 further stores the cookie associated with server A provided by message 225.

Server B receives message 209 with the index and the cookie of the entire data block. Server B then determines from the index which section of the data block has already been sent to server A and identifies the next section of the cookie to be sent. Server B then sends a message to client 201 similar to message 243. The message includes the request that contains a query string with the size of the entire data block, the next section of the data block, instructions for client 201 to redirect the request to server A, and the cookie with the entire data block. Thus, messages 243, 207, 225 and 209 are repeated to progressively transfer the data block from server B to server A. After server A has received the entire data block, server A may send message 229 to provide content to client 201.

To further enhance security and save network bandwidth on future client communication with server A, after server A has received the entire data block, server A may be configured to inform server B so that server B may discard data related to the data block transfer. For example, in response to receiving the last section of the data block, server A may send a message 227 that includes a query string with a flag for indicating that the entire data block has been received. Message 227 is redirected by client 201 as message 211 to server B. In response to message 211, server B may send a message 245 to client 201 to reset or delete the cookie with the data block. The message may also include a query string with a flag for confirming that the cookie has been deleted. The client redirects message 245 as message 213 to server A. Server A receives message 213 that includes the confirmation flag from server B.

It is to be appreciated that multiple cookies may be used by server A and server B to store data blocks. For example, multiple cookies may be used to store a data block that is too large to be stored in one cookie. Also, multiple cookies may be used to transfer different data blocks between the same servers.

It is also to be appreciated that the example messages and communication method shown in FIG. 2 may be used by any computing devices for transferring any type of data blocks. For example, the messages and method may be used by requestor 101, application server 115 and STS server 125 shown in FIG. 1 to transfer a security token from STS server 125 to application server 115.

Figure 3:
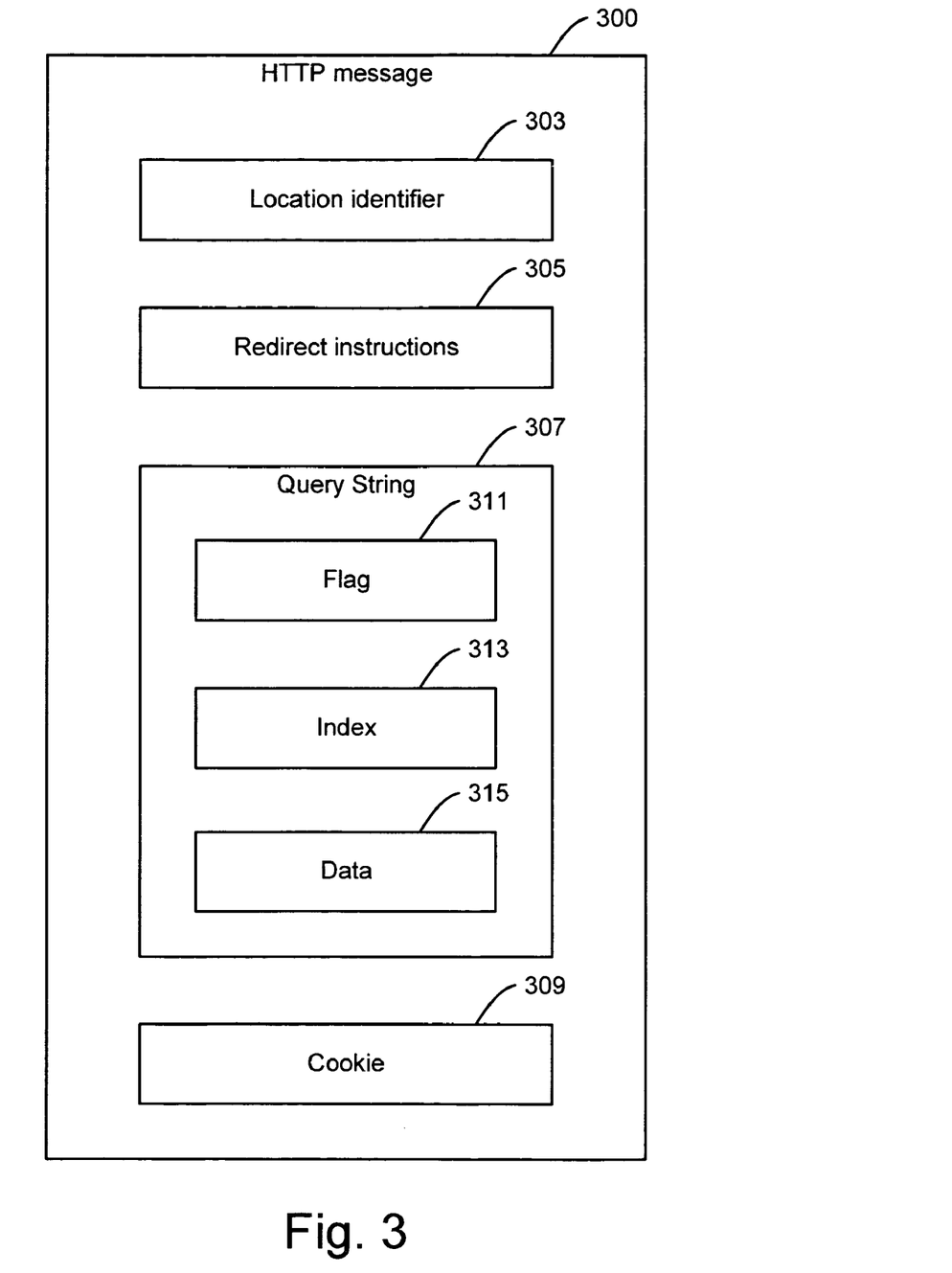
FIG. 3 shows an example data structure that may be used to transfer a data block between two servers.

FIG. 3 shows an example data structure that may be used to transfer a data block between two servers. As shown in FIG. 3, the example data structure is implemented as HTTP message 300. HTTP message 300 typically includes location identifier 303, redirect instructions 305, query string 307 and cookie 309. Location identifier 303 identifies an intermediate server to which HTTP message 300 is to be sent. Location identifier 303 may include a URL, an IP address, or other types of identifiers. Redirect instructions 305 may include instructions for the intermediate computing device to redirect HTTP message 300 to a destination server. Redirect instructions 305 typically include a location identifier associated with the destination server.

Query string 307 is a segment of HTTP message 300 that may be used to pass any type of information from an originating server to a destination server. As shown in FIG. 3, query string 307 may include flag 311, index 313, and data 315. Flag 311 may be used to indicate a particular state to the destination server. For example, flag 311 may indicate to the destination server that the originating server requires a data block to be transferred using query strings, that the transfer has been completed, or the like. Index 313 may be used to indicate the length of the data block or a point in the data block. For example, if the data block is partitioned into sections, index 313 may indicate an end point of a particular section or a start point of the next section of the data block. Data 315 may include a section of the data block indicated by index 313. The data block may be converted from binary to base 64 and may be compressed to reduce the overall size. Cookie 309 may contain the data block or a section of the data block.

Figure 4:
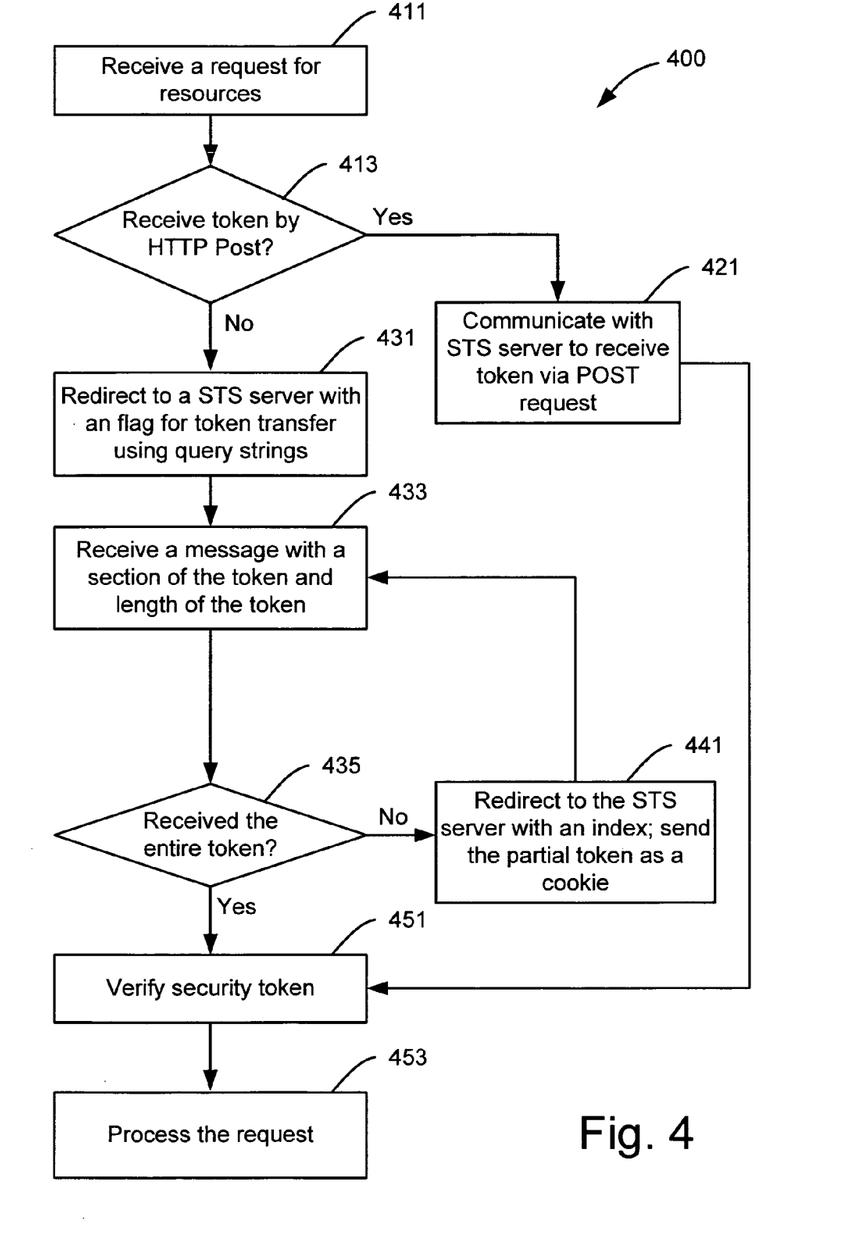
FIG. 4 shows an example process for receiving a data block by query strings in HTTP request messages.

FIG. 4 shows an example process 400 for receiving a data block by query strings in HTTP request messages. Example process 400 is shown in the context of receiving a security token. Particularly, example process 400 may be implemented by an application server, such as application server 115 in FIG. 1, to receive a security token from a security token server, such as STS server 125. However, the process may be applied to the transfer of any type of data block.

At block 411, a request for resources is received. The request may be sent by a client, such as requestor 101. The request is typically a HTTP Get request. To respond to the request, the application server requires a security token issued by the STS server. At decision block 413, a determination is made whether the security token will be received by HTTP Post request. If so, process 400 moves to block 421 where communication with STS server is performed to receive token via POST request. The process then continues at block 451.

Returning to decision block 413, if the security token will not be received by HTTP Post request, process 400 moves to block 431 where an HTTP message is redirected through the client to the STS server. The message includes an indicator for token transfer using query strings. The indicator may be implemented as a flag in a query string that is included in the message.

At block 433, a HTTP request redirected through the client from the STS server is received by the application server. The request includes a section of the security token and the length of the security token. At decision block 435, a determination is made whether the entire security token has been received. If not, process 400 moves to block 441 where a HTTP message is redirected through the client to the STS server. The message includes an index associated with the received section of the security token and a cookie that includes the received section. Process returns to block 433 and repeats the steps in blocks 433, 435 and 411 until a complete security token is received. Multiple cookies may be used to store the security token if the size of the token is too large to be stored in a single cookie.

Returning to decision block 435, if the entire security token has been received, process 400 continues at block 451 where the security token is verified. At block 453, the request from the client is processed.

Figure 5:
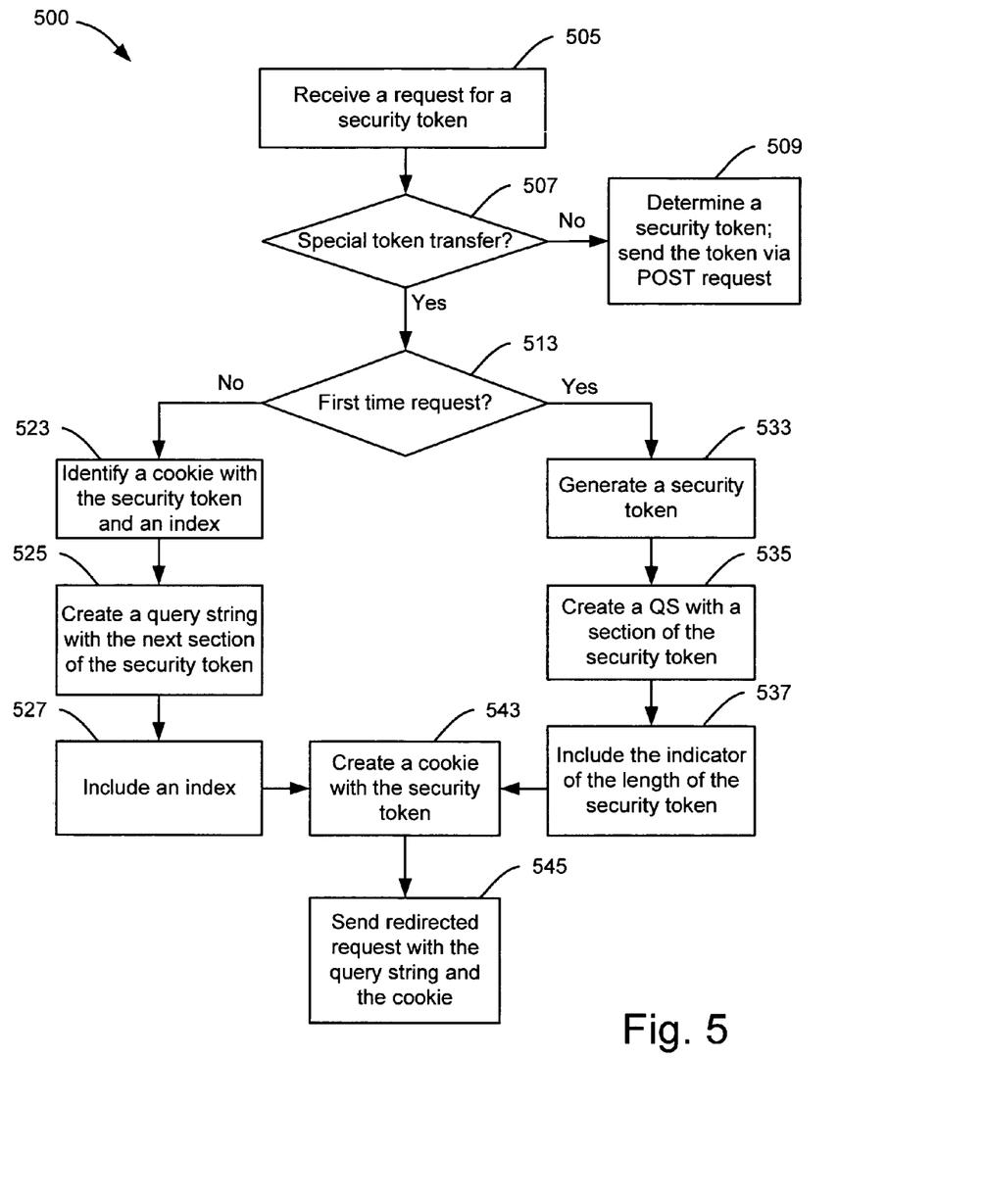
FIG. 5 shows an example process for providing a data block to a server by transferring the data block in the query strings of HTTP request messages.

FIG. 5 shows an example process 500 for providing a data block to a server by transferring the data block in the query strings of HTTP request messages. Although example process 500 is shown in the context of providing a security token, the process may be used to provide any type of data block. For example shown in FIG. 5, process 500 may be implemented by a STS server to provide a security token to an application server.

At block 505 a request for a security token is received from an application server by redirection through the client. At decision block 507, a determination is made whether special token transfer is required. The determination may be made in any manner. For example, the request may include a flag for indicating that special token transfer is required. If special token transfer is not required, process 500 moves to block 509 where a security token is determined and the security token is sent via a redirected Post request to the application server.

Returning to decision block 507, if special token transfer is required, process 500 moves to decision block 513 where a determination is made whether the request for security token is a first time request. If the request is a first time request, process 500 moves to block 533 where a security token is generated. The security token server may gather information for generating the security token by any means, such as checking information in storage, interacting with other servers, prompting a user for information, or the like. At block 535, a query string containing the security token is created. Typically, the length of the security token is too long to be encoded in the query string of a single HTTP message. Thus, the security token is generally partitioned into multiple sections and only a section of the security token is included in the query string of each HTTP message. At block 537, an indicator representing the length of the security token is determined and included in the query string. The process continues at block 543.

Returning to decision block 513, if the request is not a first time request, process 500 moves to block 523 where a cookie with the security token and an index are identified. Typically, the cookie is sent in a message from the client along with the request for the security token and the index is included in the query string of the request. The index indicates the section of the security token that has been sent by one or more previous responses. At block 525, the next section of the security token that has not been previously sent is determined and a query string with the determined section is created. At block 527, a new index is determined and included in the query string. This index indicates the section of the security token that will be sent after the current request is processed. If the entire security token will be sent, the index may be excluded, may indicate that the end of the security token or may include other values for indicating that the transfer of the security token has been completed.

At block 543, a cookie is created with the security token. The cookie may include the entire security token or just the section of the security token that has not been sent and the index corresponding to that section. Multiple cookies may be used if the size of the token is too large to be stored in a single cookie. At block 545, a response is sent to the client for redirecting to the application server. The response includes the query string and the cookie. It is to be appreciated that the new index is not required. For example, the STS server may simply resend the indicator representing the length of the security token. The application server may determine whether it has received the entire token by comparing the total size of the data received against the indicator.

Figure 6:
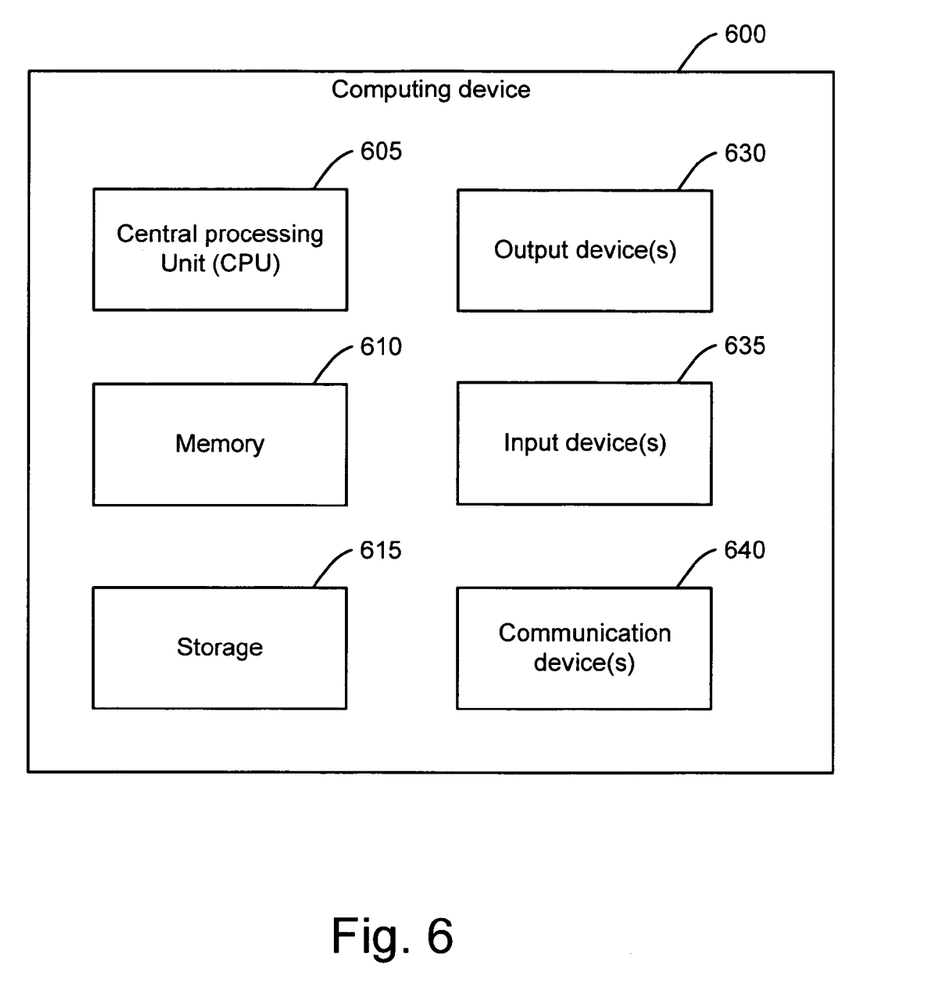
FIG. 6 shows an exemplary computer device for implementing the described systems and methods.

FIG. 6 shows an exemplary computer device 600 for implementing the described systems and methods. In its most basic configuration, computing device 600 typically includes at least one central processing unit (CPU) 605 and memory 610.

Depending on the exact configuration and type of computing device, memory 610 may be volatile (such as RAM), non-volatile (such as ROM, flash memory, etc.) or some combination of the two. Additionally, computing device 600 may also have additional features/functionality. For example, computing device 600 may include multiple CPU's. The described methods may be executed in any manner by any processing unit in computing device 600. For example, the described process may be executed by both multiple CPU's in parallel.

Computing device 600 may also include additional storage (removable and/or non-removable) including, but not limited to, magnetic or optical disks or tape. Such additional storage is illustrated in FIG. 6 by storage 615. Computer storage media includes volatile and nonvolatile, removable and non-removable media implemented in any method or technology for storage of information such as computer readable instructions, data structures, program modules or other data. Memory 610 and storage 615 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 600. Any such computer storage media may be part of computing device 600.

Computing device 600 may also contain communications device(s) 640 that allow the device to communicate with other devices. Communications device(s) 640 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 600 may also have input device(s) 635 such as keyboard, mouse, pen, voice input device, touch input device, etc. Output device(s) 630 such as a display, speakers, printer, etc. may also be included. All these devices are well know in the art and need not be discussed at length.

While the preferred embodiment of the invention has been illustrated and described, it will be appreciated that various changes can be made therein without departing from the spirit and scope of the invention.

The invention claimed is:

1. A method comprising:
receiving a request from an application server redirected through a client that does not support execution of scripts to create Hyper-Text Protocol (HTTP) Post messages;
determining a security token in response to the request;
determining that the security token must be sent in a query string;
in response to determining that the security token must be sent in a query string:
partitioning the security tokens into sections;
determining an identifier indicating the length of the security token;
generating a query string containing the identifier and at least one section of the security token;
generating a cookie containing the security token;
including the cookie in an HTTP message; and
sending the HTTP message with a location identifier for the application server to the client so that the client can redirect the message to the application server, the HTTP message including the query string containing the identifier and at least one section of the security token, the HTTP message further including the cookie for storing on the client; and receiving a second HTTP message from the client, the second HTTP message including the cookie containing the security token and a second query string containing an index;

identifying a current section of the security token indicated by the index;

generating a third query string containing the current section of the security token; and sending a third HTTP message with the location identifier for the application server to the client, the third HTTP message including the third query string.

2. The method as recited in claim 1, further comprising:
generating another cookie containing the security token without the current section; and
including the another cookie with the third HTTP message.

3. The method as recited in claim 1, further comprising:
receiving a second HTTP message from the client, the second HTTP message including the cookie containing a security token and a second query string containing an index;
identifying a current section of the security token indicated by the index;
determining another index indicating a next section of the security token after the current section;
generating a third query string containing the current section of the security token and the other index; and
sending a third HTTP message with the location identifier for the application server to the client, the third HTTP message including the third query string.

4. The method as recited in claim 3, further comprising repeating the acts recited in claim 5 until all sections of the security token have been sent.

5. The method as recited in claim 1, further comprising:
receiving a second HTTP message from the client, the second HTTP message including a flag indicating that the security token transfer has been completed; and
in response to the received HTTP message, sending a third HTTP message to the client to reset the cookie containing the security token.

6. The method as recited in claim 1, further comprising encoding the security token in base 64.

7. The method as recited in claim 1, further comprising performing data compression on the security token.

8. The method as recited in claim 1, further comprising:
performing data compression on the security token; and
encoding the compressed security token in base 64.

9. A method comprising:
receiving a request from a client;
in response to the request from the client, determining that the client does not support execution of scripts to create Hyper-Text Transfer Protocol (HTTP) Post messages;
in response to determining that the client does not support execution of scripts to create HTTP Post messages, sending a first HTTP message to the client with a location identifier for a security token service (STS) server, the first HTTP message including a request to transfer a security token using query strings;
receiving a second HTTP message from the STS server redirected through the client, the second HTTP message including a query string with a first section of a security token; and sending a third HTTP message to the client with the location identifier for the STS server, the third HTTP message including a request for a second section of the security token.

10. The method as recited in claim 9, further comprising repeating the receiving the second HTTP message and sending the third HTTP messages acts until all of the sections of the security token have been received.

11. The method as recited in claim 9, further comprising:
generating a cookie containing the first section of the security token; and including the cookie in the third HTTP message for storing on the client.

12. The method as recited in claim 11, further comprising determining a new section of the security token to request based, at least in part, on identifying in the cookie sections of the security token that have already been received.

13. The method as recited in claim 9, further comprising:
in response to receiving all sections of the security token, verifying the security token;
when the security token is valid, providing data responsive to the request from the client.

14. The method as recited in claim 13, further comprising performing data decompression before verifying the security token.

15. A method for transferring a data block to a server through a client, comprising:
determining that the data block must be sent using query strings;
in response to determining that the data block must be sent in a query string:
partitioning the data block into sections;
determining an identifier indicating the length of the data block;
generating a first query string including the length identifier and a first section of the data block;
creating a cookie containing the block; and
sending a first message with a location identifier for the server to the client, the first message including a first Hyper-Text Transfer Protocol (HTTP) request containing the query string and the cookie for storing on the client, the query string including the length identifier and the first section of the data block, wherein the client does not support execution of scripts to create HTTP Post messages; and
receiving a second message from the server redirected through the client, the second message including a second HTTP request and the cookie;
identifying an index in the second HTTP message;
determining a next section of the data block based, at least in part, on the index;
generating a second query string containing the next section; and
sending a third message with the location identifier for the server to the client, the third message including a HTTP request containing the second query string.

16. A computer system comprising:
a processing unit configured to execute computer readable instructions;
a computer storage medium with computer readable instructions that when executed by the processing unit cause the processing unit to:
receive a request from an application server redirected through a client that does not support execution of scripts to create Hyper-Text Transfer Protocol (HTTP) Post messages;
determine a security token in response to the request;

determine that the security token must be sent in a query string;
in response to determining that the security token must be sent in a query string:
partition the security token into sections;
determining an identifier indicating the length of the security token;
generate a query string containing at least one section of the security token and the identifier;
generate a cookie containing the security token; and
include the cookie in an HTTP message; and
send the HTTP message with a location identifier for the application server to the client, the HTTP message including the query string containing the identifier and at least one section of the security token, the HTTP message further including the cookie for storing on the client; and
receive a second HTTP message from the client, the second HTTP message including the cookie containing the security token and a second query string containing an index;
identify a current section of the security token indicated by the index; generate a third query string containing the current section of the security token; and
send a third HTTP message with the location identifier for the application server to the client, the third HTTP message including the third query string.

17. The computer system as recited in claim 16, wherein the computer storage medium further comprises instructions that when executed by the processing unit cause the processing unit to:
generate another cookie containing the security token without the current section; and
include the other cookie with the third HTTP message.

18. The computer system as recited in claim 16, wherein the computer storage medium further comprises instructions that when executed by the processing unit cause the processing unit to:
receive a second HTTP message from the client, the second HTTP message including the cookie containing the security token and a query string containing an index;
identify a current section of the security token intoxicated by the index;
determine another index indicating a next section of the security token after the current section;
generate a third query string containing the current section of the security token and the other index; and
send a third HTTP message with the location identifier for the application server to the client, the third HTTP message including the third query string.

19. The computer system as recited in claim 18, wherein the computer storage medium further comprises instructions that when executed by the processing unit cause the processing unit to:
repeat the acts recited in claim 18 until all sections of the security token have been sent.

20. The computer system as recited in claim 16, wherein the computer storage medium further comprises instructions that when executed by the processing unit cause the processing unit to:
receive a second HTTP message from the client, the second HTTP message including a flag indicating that the security token transfer has been completed; and
in response to receiving the second HTTP message, send a third HTTP message to the client to reset a cookie containing the security token.

21. The computer system as recited in claim 16, wherein the computer storage medium further comprises instructions that when executed by the processing unit cause the processing unit to:
encode the security token in base64.

22. The computer system as recited in claim 16, wherein the computer storage medium further comprises instructions that when executed by the processing unit cause the processing unit to:
perform data compression on the security token.

23. The computer system as recited in claim 16, wherein the computer storage medium further comprises instructions that when executed by the processing unit cause the processing unit to:
perform data compression on the security token; and
encode the compressed security token in base64.

24. A computer system comprising:
a processing unit configured to execute computer readable instructions;
a computer storage medium storing computer readable instructions that when executed by the processing unit cause the processing unit to:
receive a request from a client;
in response to the request from the client, determine that the client does not support execution of scripts to create Hyper-Text Transfer Protocol (HTTP) Post messages;
in response to determining that the client does not support execution of scripts to create HTTP, send a first HTTP message to the client with a location identifier for a security token service (STS) server, the first HTTP message including a request to transfer a security token using query strings;
receive a second HTTP message from the STS server redirected through the client, the second HTTP message including a query string with a first section of the security token; and
send a third HTTP message to the to the client with the location identifier for the STS server, the third HTTP message including a request for a second section of the security token.

25. The computer system as recited in claim 24, wherein the computer storage medium further comprises instructions that when executed by the processing unit cause the processing unit to:
repeat the receiving the second HTTP message and sending the third HTTP message acts until all of the sections of the security token have been received.

26. The computer system as recited in claim 24, wherein the computer storage medium further comprises instructions that when executed by the processing unit cause the processing unit to:
generate a cookie containing the first section of the security token; and
include the cookie in the third HTTP message for storing on the client.

27. The computer system as recited in claim 24, wherein the computer storage medium further comprises instructions that when executed by the processing unit cause the processing unit to:
determine a new section of the security token to request based, at least in part, on identifying in the cookie sections of the security token that have already been received.

28. The computer system as recited in claim 24, wherein the computer storage medium further comprises instructions that when executed by the processing unit cause the processing unit to:

in response to receiving all sections of the security token, verify the security token; and when the security token is valid, provide data responsive to the request from the client.

* * * * *